(12) United States Patent
Amrine et al.

(10) Patent No.: US 11,608,655 B2
(45) Date of Patent: Mar. 21, 2023

(54) LANDSCAPE EDGING CONNECTOR

(71) Applicant: Dimex, LLC, Marietta, OH (US)

(72) Inventors: Patrick Amrine, Williamstown, WV (US); Lyle A. James, Kettering, OH (US); Kevin R. Morey, Marietta, OH (US)

(73) Assignee: Westlake Dimex LLC, Marietta, OH (US)

( * ) Notice: Subject to any disclaimer, the term of this patent is extended or adjusted under 35 U.S.C. 154(b) by 451 days.

(21) Appl. No.: 16/750,025

(22) Filed: Jan. 23, 2020

(65) Prior Publication Data

US 2020/0288647 A1    Sep. 17, 2020

Related U.S. Application Data (60) Provisional application No. 62/818,927, filed on Mar. 15, 2019.

(51) Int. Cl.
| | | |
|---|---|---|
| *E04H 17/00* | (2006.01) | |
| *F16B 5/06* | (2006.01) | |
| *A01G 9/28* | (2018.01) | |

(52) U.S. Cl.
CPC ............. *E04H 17/009* (2021.01); *A01G 9/28* (2018.02); *F16B 5/0635* (2013.01)

(58) Field of Classification Search
CPC ........ A01G 9/28; A01K 15/006; A01K 15/04; E01F 15/0469; E04H 17/009; E04H 17/04; E04H 17/063; F16B 2/20; F16B 5/0635; Y10T 24/44769; Y10T 403/7043

USPC ........ 403/363; 256/1; 52/102; 47/33; 24/545
See application file for complete search history.

(56) References Cited

U.S. PATENT DOCUMENTS

| | | | |
|---|---|---|---|
| 2,184,904 A | 12/1939 | Boehme | |
| 3,788,001 A | 1/1974 | Balfanz, Jr. | |
| 3,841,022 A | 10/1974 | Thodos | |
| 4,349,596 A | 9/1982 | Hendrix | |
| 4,372,079 A | 2/1983 | Trageser | |
| 4,628,632 A | 12/1986 | Zwier | |
| 4,831,776 A | 5/1989 | Fritch | |
| 4,969,289 A | 11/1990 | Trifiletti | |
| 5,157,867 A | 10/1992 | Fritch | |
| D336,220 S * | 6/1993 | Grimes | ..... A01G 9/28 D8/1 |
| 5,259,154 A | 11/1993 | Lilley | |
| 5,265,374 A * | 11/1993 | Crane | ..... A01G 9/28 256/1 |
| 5,377,447 A * | 1/1995 | Fritch | ..... A01G 9/28 47/33 |
| 5,421,118 A * | 6/1995 | Bauer | ..... A01G 9/28 47/33 |
| 5,857,288 A * | 1/1999 | Wiste | ..... A01G 9/28 47/33 |
| 5,926,999 A | 7/1999 | Vernon et al. | |
| 6,076,327 A * | 6/2000 | Hendrickson | ..... E04B 1/34342 52/102 |
| 6,379,078 B1 | 4/2002 | Zwier | |

(Continued)

*Primary Examiner* — Josh Skroupa
(74) *Attorney, Agent, or Firm* — Wood Herron & Evans LLP (57) ABSTRACT

A landscape edging installation includes ends of landscape edging joined together by a connector. The connector may have holes in lugs that are aligned with holes in the landscape edging tabs to receive a ground spike therethrough. The connector conceals a gap between the adjacent edging pieces.

15 Claims, 9 Drawing Sheets

(56) References Cited

U.S. PATENT DOCUMENTS

| | | | |
|---|---|---|---|
| 6,397,413 B2 | 6/2002 | Epstein et al. | |
| 6,839,920 B2 | 1/2005 | Schulte | |
| D548,368 S | 8/2007 | Hale et al. | |
| 7,647,739 B2 * | 1/2010 | Boyd | E04B 9/32 24/545 |
| 8,056,195 B2 * | 11/2011 | Zwier | A01G 9/28 24/545 |
| 8,585,313 B2 | 11/2013 | Wojotowicz et al. | |
| D745,643 S * | 12/2015 | Rowton | A01G 9/28 D25/102 |
| 9,313,956 B2 * | 4/2016 | Volin | A01G 9/28 |
| 10,060,081 B2 * | 8/2018 | Altieri, III | A01G 9/28 |
| 10,182,532 B1 * | 1/2019 | Asher | A01G 9/28 |
| 10,729,077 B2 * | 8/2020 | Bahler | A01G 9/28 |
| 11,490,730 B2 * | 11/2022 | Liss | A47B 96/1441 |
| 2008/0163566 A1 * | 7/2008 | Bella | A01G 9/28 52/102 |

* cited by examiner

LANDSCAPE EDGING CONNECTOR

This claims priority to U.S. Provisional Patent Application Ser. No. 62/818,927 filed Mar. 15, 2019 and hereby incorporated by reference in its entirety.

BACKGROUND OF THE INVENTION

This invention relates to landscape edging, and more particularly to a connector for joining individual sections of landscape edging installed in a landscape setting.

A variety of landscape edging products exist in the prior art. Examples include those assigned to the assignee of this invention and are disclosed in U.S. Pat. Nos. D840,059; D840,058; D800,352; D797,320; D797,319; D776,834; D773,074; D748,823; D748,822; D733,936; D612,072; D606,670; D586,005; D548,368; and U.S. Patent Application Publication No. 2018/0298577, each of which is hereby incorporated by reference herein, in its entirety.

One problem which has not been adequately addressed in the prior art landscape edging products is particularly prevalent in colder climatic areas, where freezing and thawing of earth causes thermal expansion and damage to the edging. Such expansion has the tendency to shift the position of or destroy the landscape edging installations over time. One reason for such improper shifting of position or destruction is due to the inability of the edging structure to thermally expand and contract without disrupting the position of the landscape edging sections.

It is an object of this invention to provide a landscape edging installation with multiple elements mounted in series to increase the length of the structure. The multiple elements are secured together such that thermal expansion and contraction of the restraint structure due to large changes in temperature of the restraint structure and adjacent materials, does not damage the edging or provide an uneven edge.

SUMMARY OF THE INVENTION

These and other shortcomings in the prior art have been addressed by a landscape edging connector according to various embodiments of this invention. A landscape edging installation may include a connector according to an embodiment of this invention. The connector joins the adjacent longitudinal ends of landscape edging sections. Each landscape edging section may include an upstanding, generally vertically oriented wall and a number of spaced tabs extending horizontally along the length of the landscape section. Each tab is joined to a bottom portion of the upstanding wall and projects forwardly to be juxtaposed against the surface of the ground surrounding the landscape edging installation. Each tab may have a hole through which a shaft of a spike may be inserted. The shaft is inserted into the ground and through the hole in the tab to secure the landscape edging to the ground. A head of the spike may be positioned on top of the tab.

The connector according to one embodiment of this invention is fitted over the top edge of the upstanding wall and extends downwardly along a back face of the upstanding wall and is bent to underly the horizontal portions of the landscape edging sections including the tabs of each section adjacent to a longitudinal end of the associated section. The connector may include an upper cap portion with downwardly depending front and back walls. The front wall, cap and back wall combine to form a generally inverted J-shaped cross-sectional configuration. Extending downwardly from the lower edge of the back wall is a number of spaced pliable fold lines formed in the connector. One advantage of the spaced, multiple, pliable fold lines on the connector according to various embodiments of this invention is that the connector can be utilized for a snug fit onto various landscape edgings which have a range of upstanding wall heights. The appropriately positioned and sized connector is folded along one of the pliable fold lines to position spaced lugs joined by a span beneath the tabs of the adjacent landscape edging sections. The lugs and span joining them are folded to be generally perpendicular to the back wall and to be beneath the tabs of the edging sections.

Installation of the connector begins with positioning the adjacent longitudinal edges of the landscape edging sections with a gap therebetween. The gap allows for expansion and contraction of the landscape edging sections due to climatic changes at the landscape installation. Such expansion and subsequent contraction of the landscape edging sections do not interfere with one another, buckle or distort the landscape edging as is common in many prior landscape edging connectors and associated installations. The connector is folded along the appropriate fold line depending on the height of the edging vertical wall and to position the connector lugs beneath the tabs. Holes in the lugs and tabs are aligned to receive a spike therethrough to secure the connector and join the edging sections together.

Alternative connector designs of this invention include contoured shapes to conform to the landscape edging and connectors with single lugs that do not utilize the tabs of the landscape edging sections being joined.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
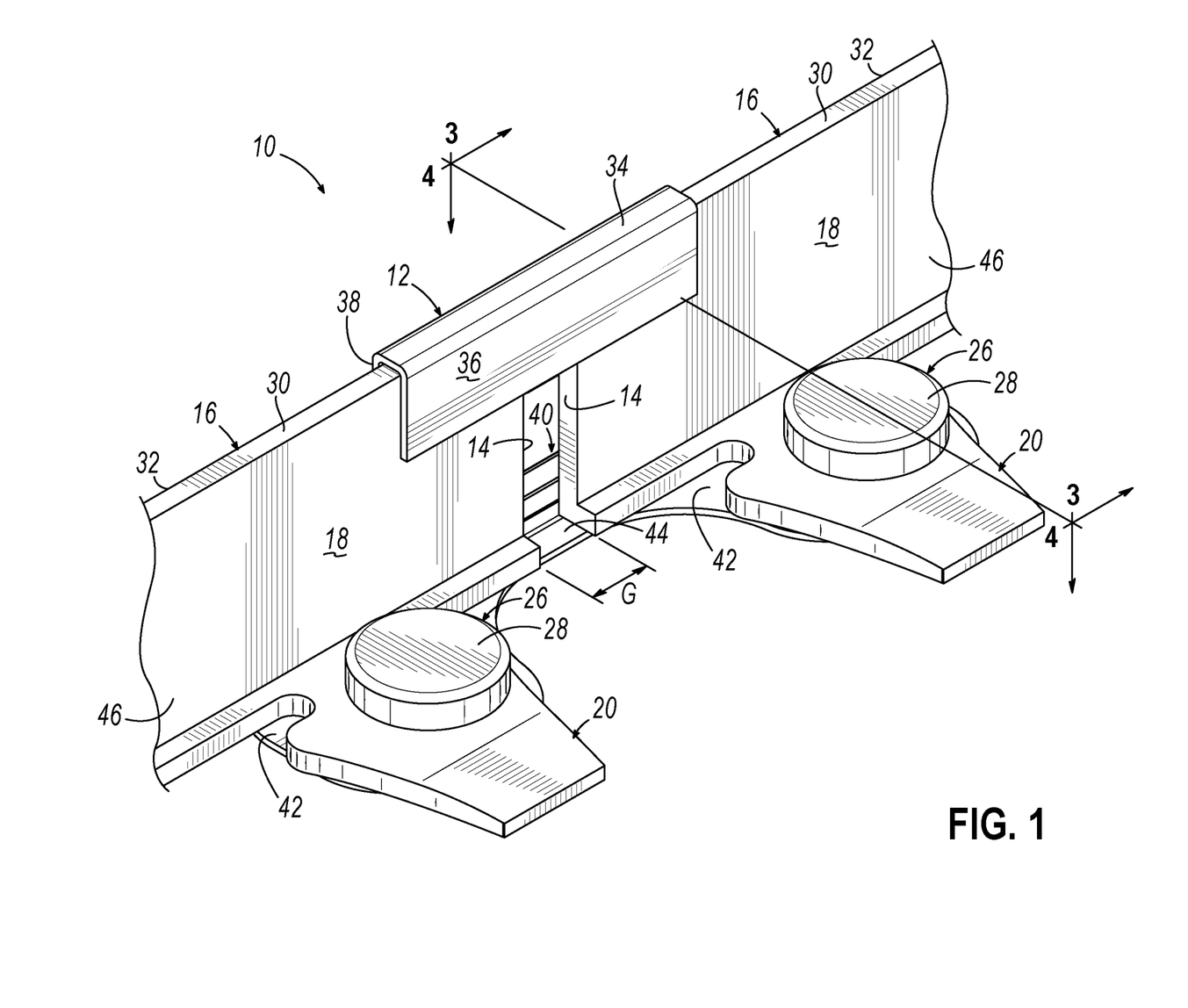
FIG. 1 is a front perspective view of a connector joining adjacent landscape edging sections together according to one embodiment of this invention.

Referring to FIG. 1, a landscape edging installation 10 is shown which includes a connector 12 according to one embodiment of this invention. The connector 12 joins the adjacent longitudinal ends 14 of landscape edging sections 16. Each landscape edging section 16 according to various embodiments may include an upstanding, generally vertically oriented wall 18 and a number of spaced tabs 20 extending horizontally along the length of the landscape edging section 16. Each tab 20 is joined to a bottom portion of the upstanding wall 18 and projects forwardly to be juxtaposed against the surface of the ground surrounding the landscape edging installation 10. Each tab 20 may have a hole 22 (see FIG. 3) through which a shaft 24 of a spike 26 may be inserted. The shaft 24 is inserted into the ground and through the hole 22 in the tab 20 to secure the landscape edging 16 to the ground. A head 28 of the spike 26 is positioned on top of the tab 20 as shown in FIG. 1.

It will be appreciated that an exemplary landscape edging section 16 is shown herein and this invention may be utilized with any of a wide variety of landscape edging designs, shapes, sizes and configurations. The landscape edging shown and described herein is but one example of an applicable landscape edging section and a non-exhaustive listing is referenced hereinabove.

Figure 2:
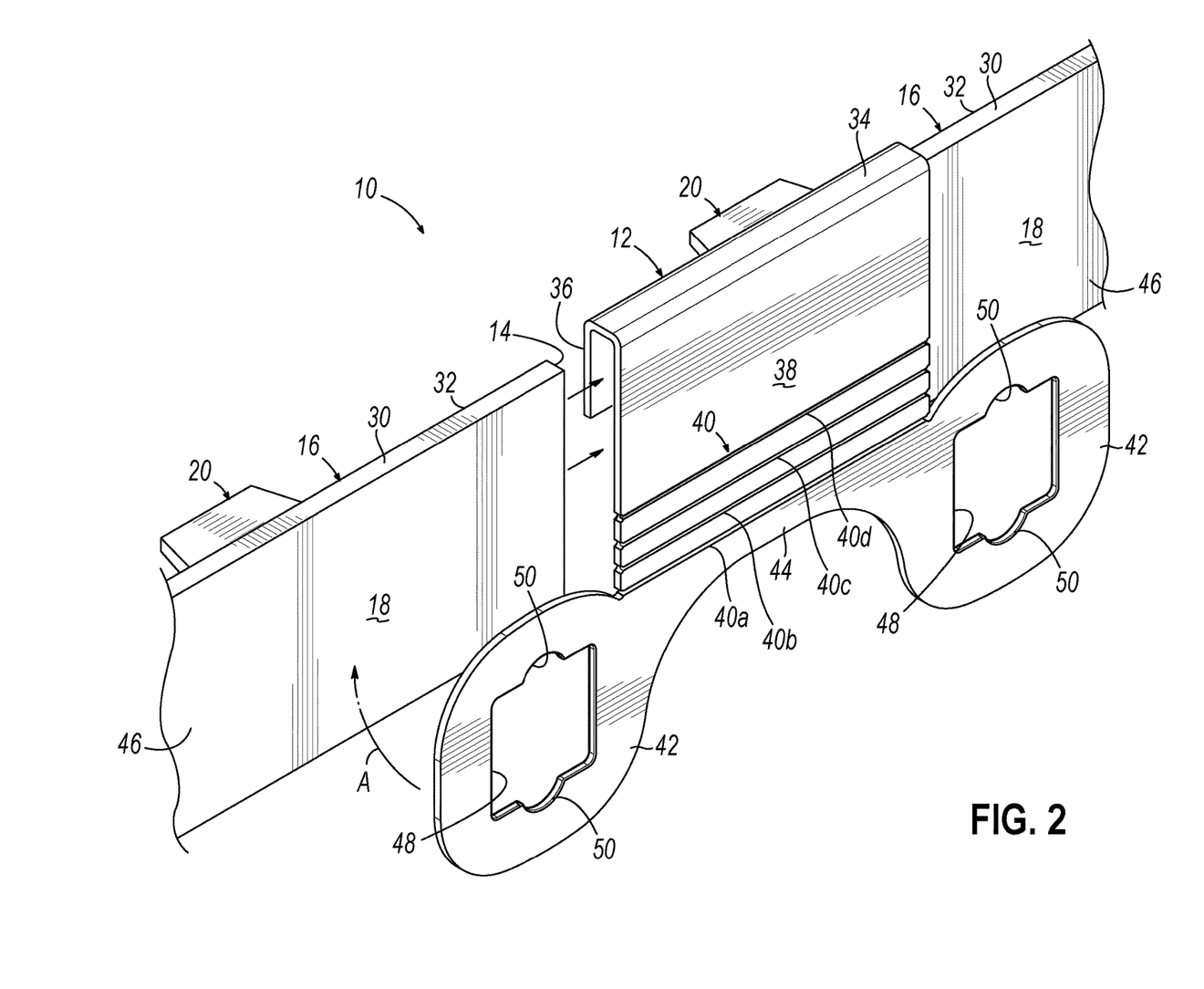
FIG. 2 a rear perspective view of the connector being installed on the landscape edging sections of FIG. 1.

Referring to FIGS. 1 and 2, the connector 12 according to one embodiment of this invention is fitted over a top edge 30 of the upstanding wall 18 and extends downwardly along a back face 32 of the upstanding wall 18 and is bent to underly the horizontal portions of the landscape edging sections 16 including the tabs 20 of each section adjacent to the longitudinal end 14 of the associated section 16. This embodiment of the connector 12 includes an upper cap 34 with downwardly depending front and back walls 36, 38. While the front and back walls have been shown and described as such for reference and identification purposes, one of ordinary skill will appreciate that these labels are for reference and identification only and either wall may be viewed as the back wall and either wall may be viewed as the front wall. The front wall 36, cap 34 and back wall 38 combine to form a generally inverted J-shaped cross-sectional configuration as best seen in FIG. 2. A number of spaced pliable fold lines 40 are formed in the connector and extend downwardly from the lower edge of the back wall. Four such pliable fold lines 40a, 40b, 40c, 40d are shown in the embodiment of FIGS. 1 and 2; however, it will be readily appreciated that any number of fold lines 40 may be included in the connector 12 according to this invention. One advantage of the spaced, multiple, pliable fold lines 40 on the connector 12 according to various embodiments of this invention is that the connector 12 can be utilized for a snug fit onto various landscape edgings 16 which have a range of upstanding wall heights. The appropriately positioned and sized connector 12 is folded along one of the pliable fold lines 40 to position spaced lugs 42 joined by a span 44 beneath the tabs 20 of the adjacent landscape edging sections 16. The lugs 42 and span 44 joining them are folded to be generally perpendicular to the back wall 38 in the direction of arrow A as shown in FIG. 2.

Figure 3:
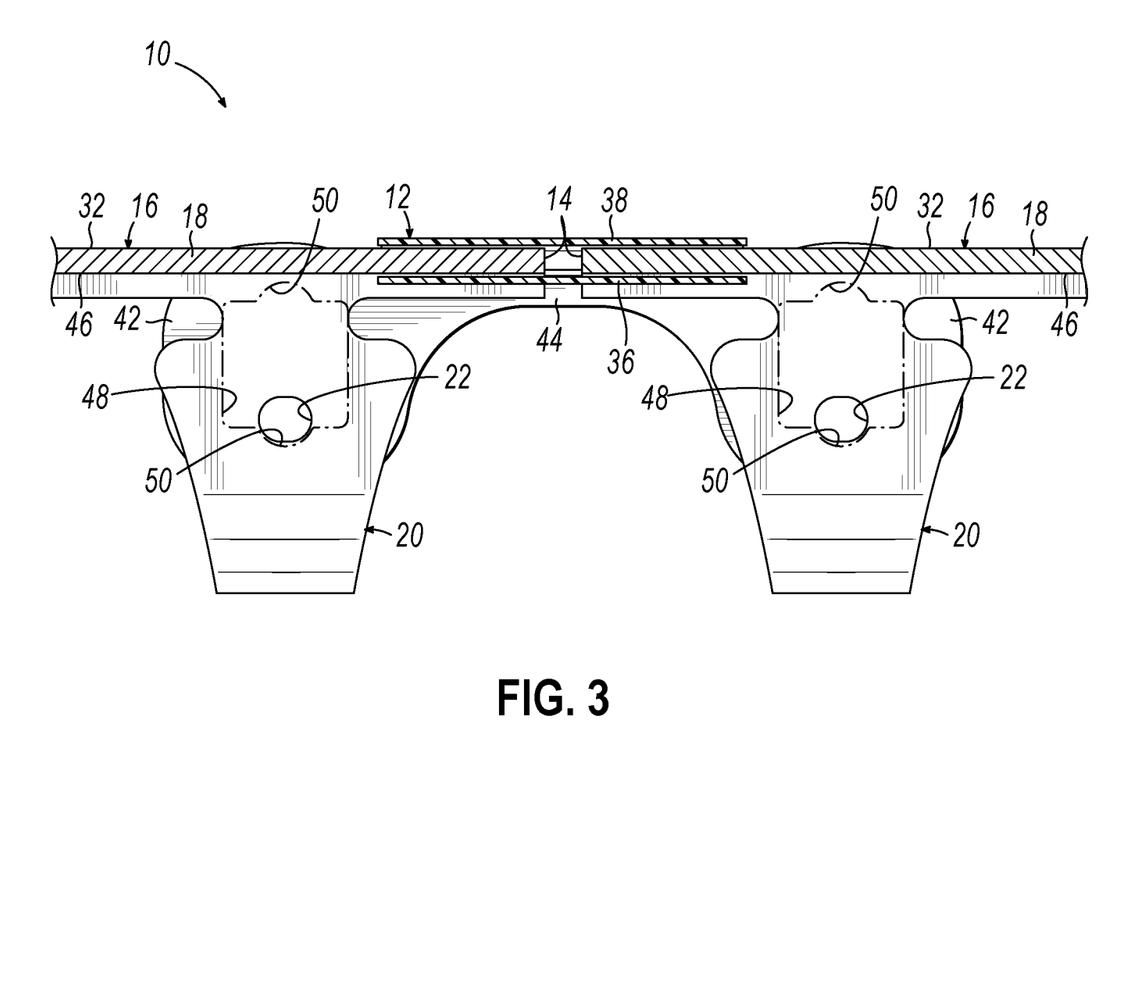
FIG. 3 is a top elevational cross-section view taken along line 3-3 of the arrangement of FIG. 1 and with the spikes removed for clarity.

Installation of the connector 12 as shown in the embodiments of FIGS. 1 through 5 begins with positioning the adjacent longitudinal edges 14 of the landscape edging sections 16 with a gap G therebetween as clearly shown in FIGS. 1 and 3. The gap G allows for expansion and contraction of the landscape edging sections 16 due to climatic changes at the landscape installation 10. Such expansion and subsequent contraction of the landscape edging sections 16 do not interfere with one another nor lead to buckling or distortion of the landscape edging as is common in many prior landscape edging 16 connectors and associated installations.

The connector 12 according to various embodiments of this invention is positioned with the cap 34 snuggly fitted on top of the top edge 30 of the adjacent landscape edging sections 16 and the front wall 36 depending downwardly along a front face 46 of the upstanding wall 18 of the landscape edging sections 16. The back wall 38 of the connector 12 likewise depends downwardly in face-to-face juxtaposition with the back face 32 of the upstanding wall 18 as shown in FIGS. 1-3. With the cap 34 snuggly fitted downwardly atop the top edge 30 of the upstanding wall 18, the connector 12 is bent along one of the pliable fold lines 40 in the direction of arrow A such that the lugs 42 and span 44 snuggly fit beneath the tabs 20 of the landscape edging sections 16 as shown in FIGS. 4 and 5.

Figure 4:
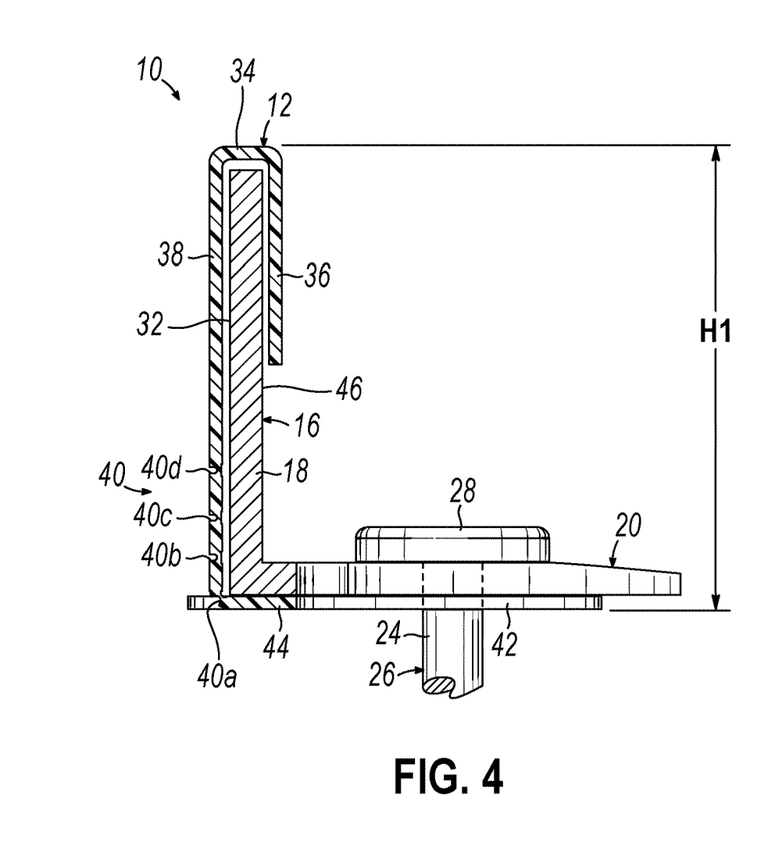
FIG. 4 is a side elevational cross-section view taken along line 4-4 of the arrangement of FIG. 1.
Figure 5:
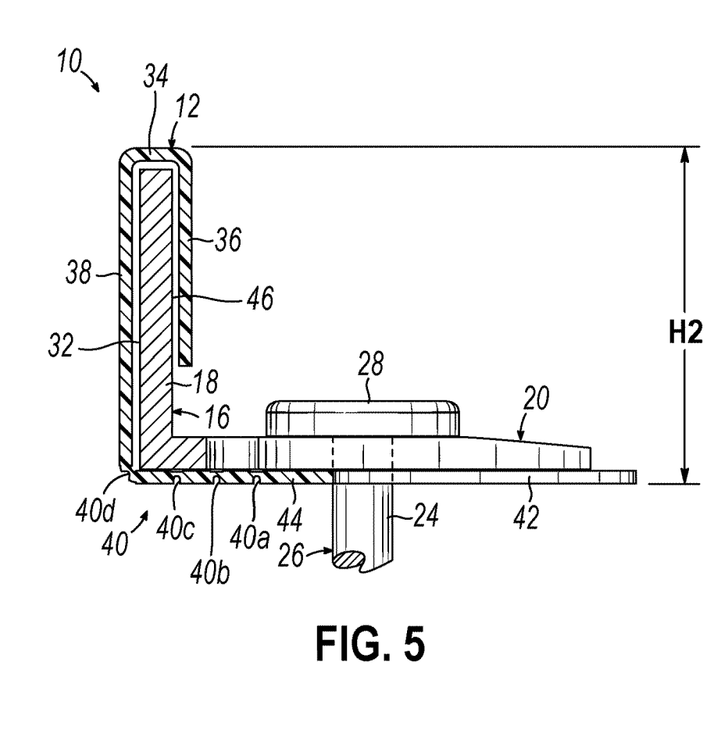
FIG. 5 is a view similar to FIG. 4 of a shorter height landscape edging sections with the connector compatibly configured therefore.

In FIG. 4, the lowermost pliable fold line 40a is bent to accommodate an upstanding wall 18 of the landscape edging sections 16 having a height H1. As shown in FIG. 5, a different pliable fold line 40d is bent to accommodate an upstanding wall height 18 of the landscape edging section 16 have a lesser height H2 while still providing for the lugs 42 and span 44 to seat against a bottom face of the tabs 20. It will be appreciated that landscape edging sections 16 having an upstanding wall 18 of a different height than that shown in FIGS. 1-5 can be accommodated with the connector 12 according to various embodiments of this invention by bending the connector 12 along the appropriate pliable fold line 40 for a proper fit with the landscape edging sections 16.

As shown clearly in FIG. 2, each lug 42 of the connector 12 includes an aperture 48. Each aperture 48 should be aligned with the hole 22 in one of the tabs 20 of the landscape edging section 16 with the shaft 24 of the spike 26 to be inserted through the aligned hole 22 and aperture and into the ground for securely positioning the connector 12 and associated landscape edging section 16 as shown in FIGS. 1, 4 and 5. The shape of the aperture 48 in the lug 42 of the connector 12 is shown in FIG. 2 to be generally rectangular with a pair of opposed notches 50. The shape of the aperture 48 may be any shape within the scope of this invention to accommodate alignment with the holes 22 in the tab 20 and the insertion of the spike 26 therethrough. The alignment of the aperture 48 in the lug 42 and hole 22 in the tab 20 is more clearly shown in FIG. 3. The holes 22 in the tabs 20 may be appropriately sized and configured to allow for movement of the tabs 20 and associate landscape edging section 16 in a longitudinal direction toward and away from the adjacent landscape edging section 16 as a result of climatic changes leading to expansion and contraction of the landscape edging sections 16 without disruption of the spike 26 and the position of the connector 12 joining the two landscape edging sections 16. Toward this end, the holes 22 may be elongated in a direction parallel to the upstanding wall 18.

Figure 7:
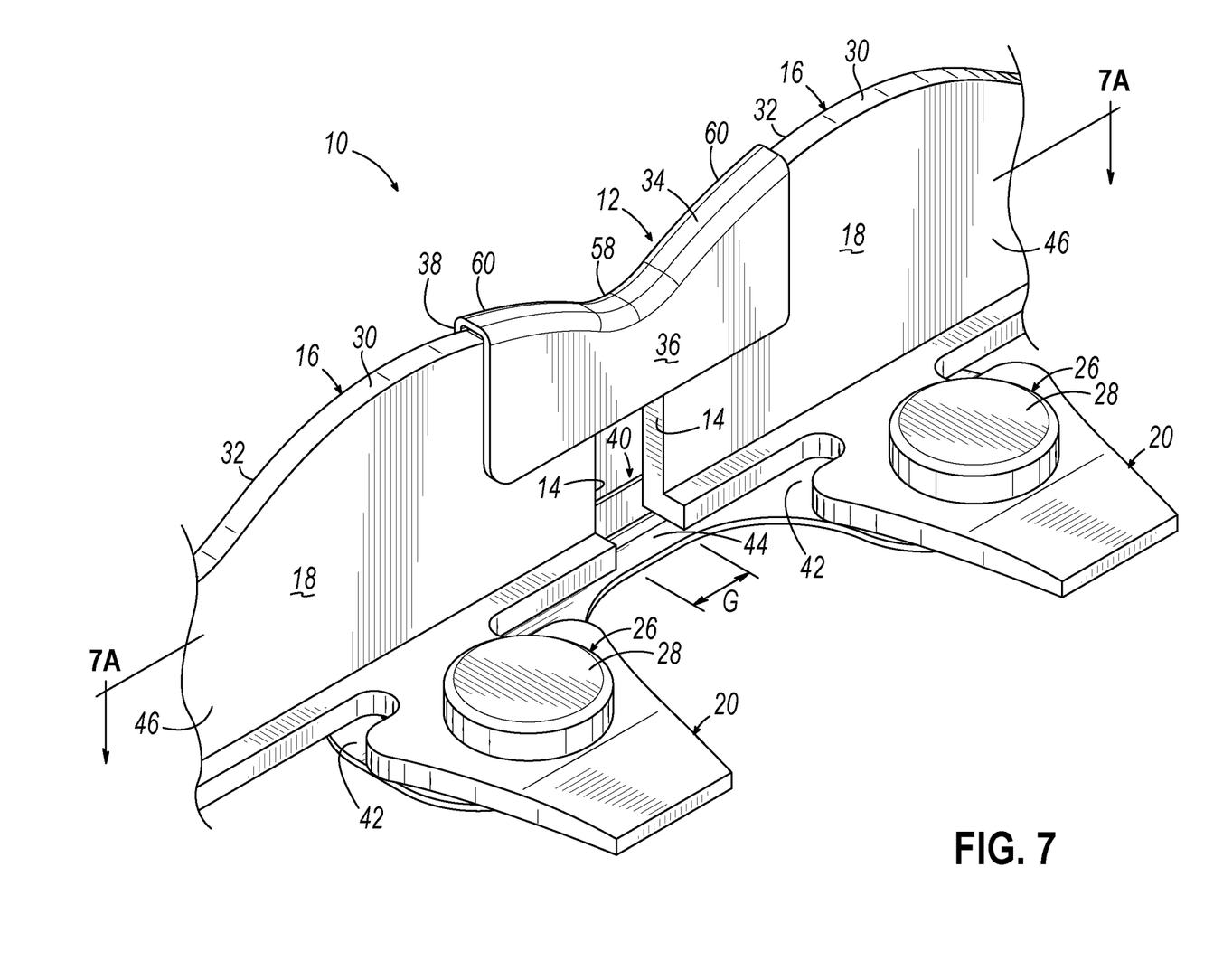
FIG. 7 is a front perspective view of a connector joining adjacent landscape edging sections together according to a further embodiment of this invention.
Figure 7A:
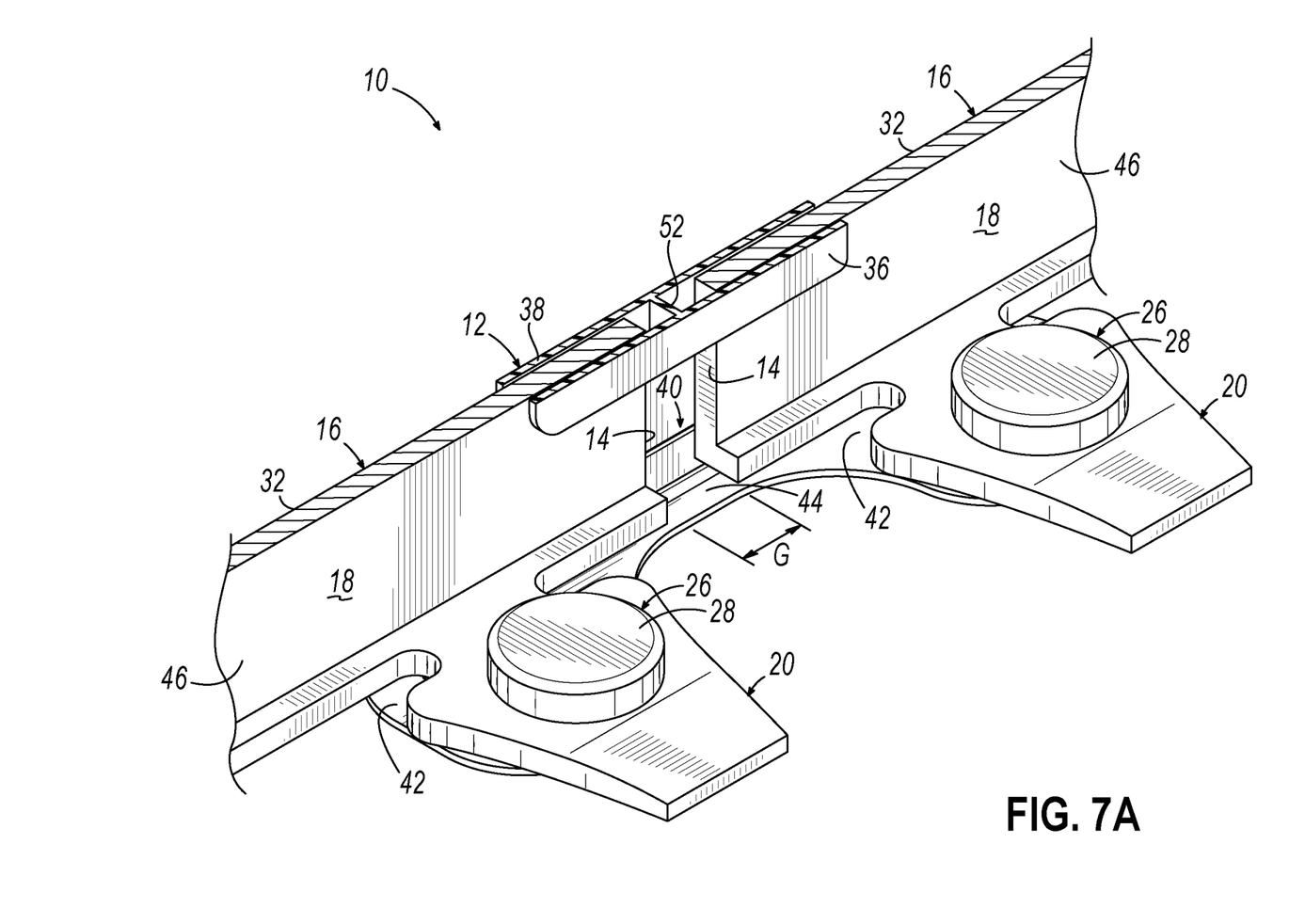
FIG. 7A is a cross-sectional view taken along line 7A-7A of FIG. 7.

The embodiment of the landscape edging section 16 as shown in FIGS. 1-5 has a generally linear or planar top surface 30 of the upstanding wall 18. As a result, the connector 12 likewise has a similar configuration to mate with the configuration of the edging section 16. Referring to FIGS. 7 and 7A, another embodiment of a connector 12 according to this invention is shown with a generally undulating cap 34 which mates with the contour of a scalloped or undulating upper edge 30 of the upstanding wall 18 having a depression 58 between a pair of bumps 60 of the landscape edging sections 16. It should be appreciated by one of ordinary skill in the art that other shapes and configurations of the connector 12 to mate with compatible shapes of the landscape edging sections 16 can be utilized within the scope of this invention.

Referring to FIG. 7A, a cross-sectional view of the connector 12 reveals a rib 52 joining the back wall 38 and front wall 36 of the connector 12 in the gap G between the longitudinal ends 14 of the landscape edging sections 16. The rib 52 offers increased strength and resistance to flexing and bowing of the front wall 36 and back wall 38 relative to one another and relative to the landscape edging sections 16.

Figure 6:
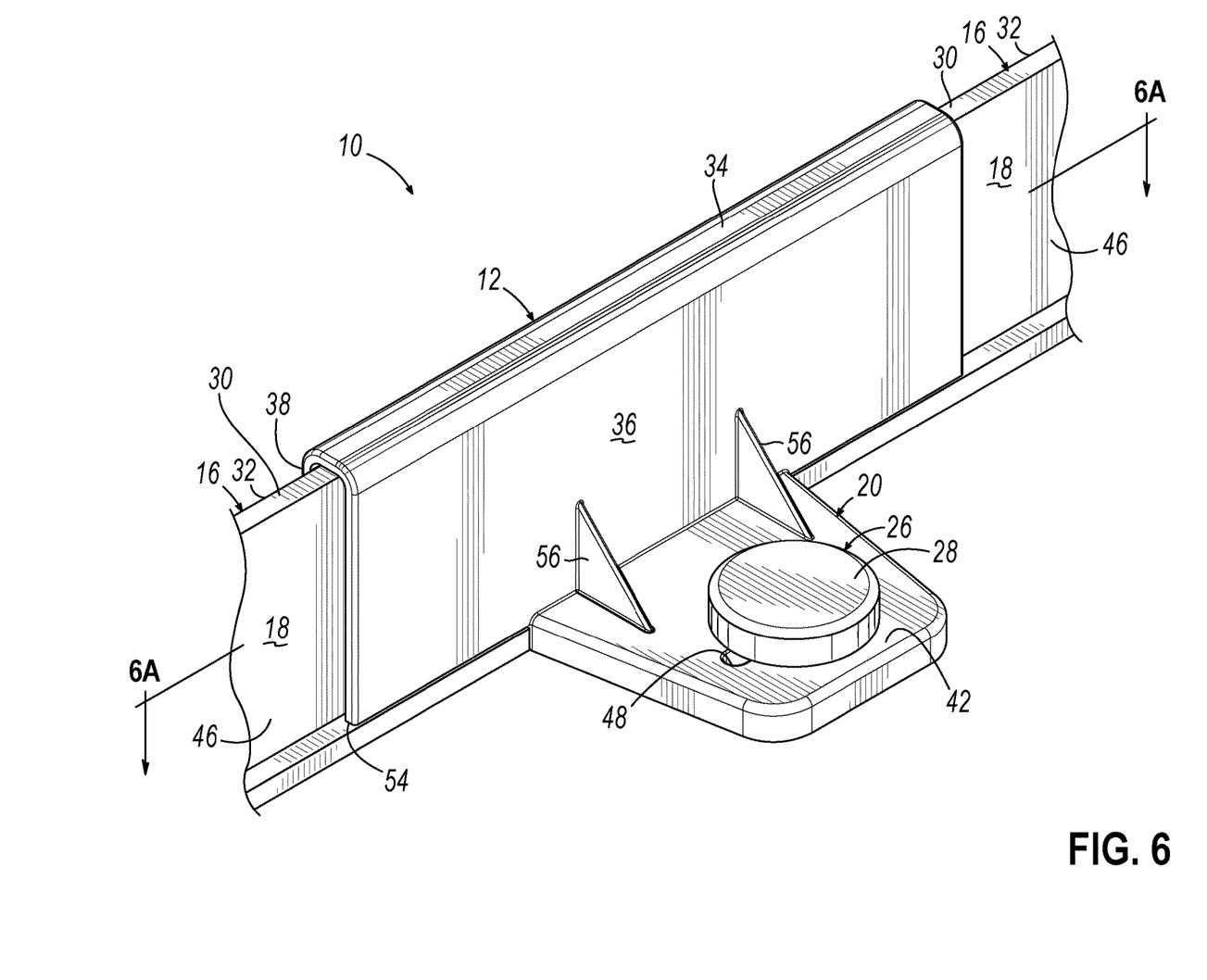
FIG. 6 is a front perspective view of a connector joining adjacent landscape edging sections together according to another embodiment of this invention.
Figure 6A:
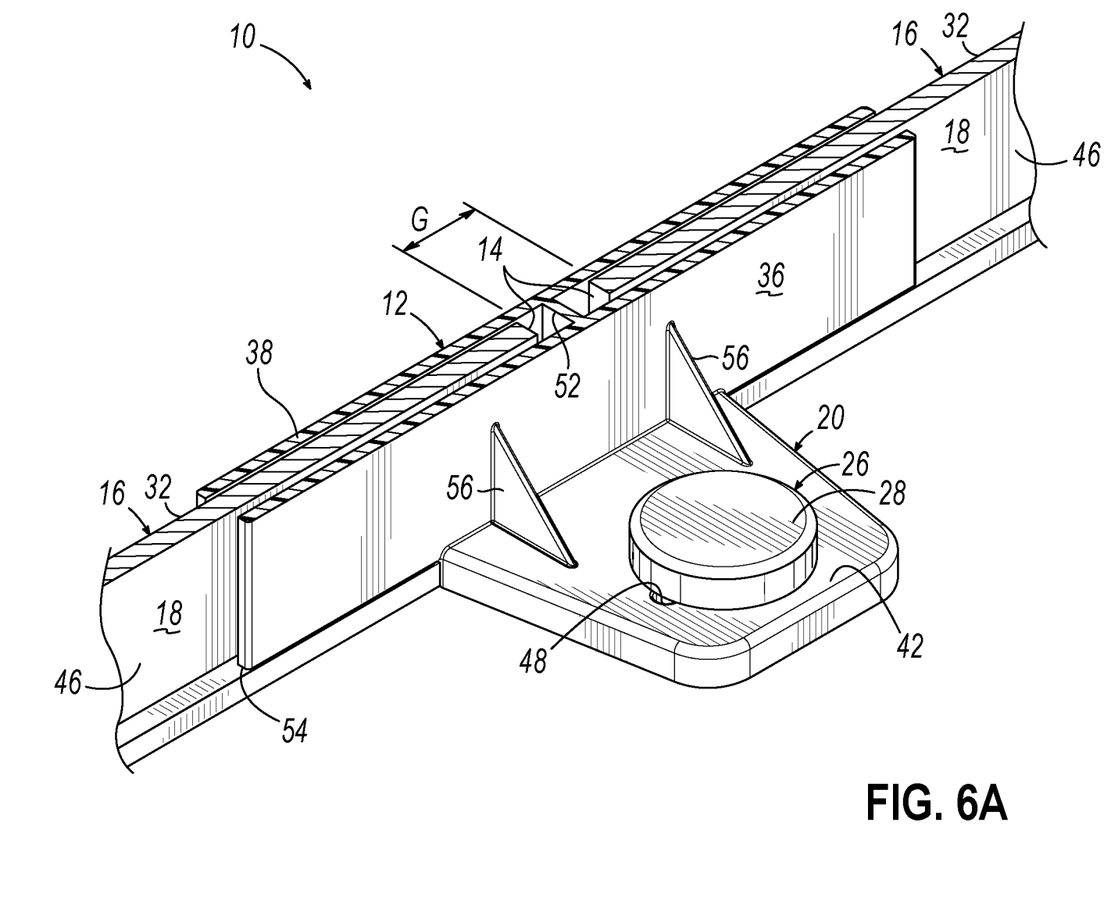
FIG. 6A is a cross-sectional view taken along line 6A-6A of FIG. 6.

Referring to FIGS. 6 and 6A, a further alternative embodiment of a connector 12 for joining landscape edging sections 16 together is shown. The connector 12 includes a back wall 38, a front wall 36 and a cap 34 joining the front wall and back wall as clearly shown in FIG. 6. The front wall 36, cap 34 and back wall 38 form a channel in a generally inverted U-shaped configuration in cross section in the embodiment shown in FIGS. 6 and 6A. A lowermost edge 54 of the front wall 36 may be seated on a horizontal ledge portion of the landscape edging sections 16 as shown in FIG. 6; whereas, a lower edge (not shown) of the back wall 38 may extend downwardly toward the bottom of the upstanding wall 18 of the landscape edging sections 16 joined together. As such, in some embodiments a height of the back wall 38 is greater than a height of the front wall 36, but in other embodiments the walls 36, 38 may have the same height. As shown clearly in FIG. 6A, the longitudinal ends 14 of the landscape edging sections 16 are likewise provided with a gap G therebetween for expansion and contraction due to climatic changes at the landscape installation site 10. Moreover, as shown in FIG. 6A, a rib 52 may be included in the gap G and join the front wall 36 and back wall 38 of the connector 12 as well as the cap 34 according to various embodiments of this invention. In some embodiments, the rib 52 is connected to the walls 36, 38 and the cap 34. The rib 52 may extend the full height of one or both walls 36, 38 or only a portion thereof.

As shown in FIGS. 6 and 6A, the connector 12 according to various embodiments of this invention includes a lug 42 projecting generally perpendicular from the front wall 36. A bottom surface of the lug 42 is positioned on the ground at the landscape edging installation 10. The lug 42 in some embodiments includes an aperture 48 through which the shaft 24 of a spike 26 may be inserted to secure the connector 12 and the landscape edging sections 16 joined by the connector 12 to the ground. The head 28 of the spike 26 is shown clearly in FIGS. 6 and 6A while it would be readily understood that the shaft 24 extends downwardly from the head 28 through the aperture 48 and into the ground. A pair of braces 56 each in a generally triangular configuration in the embodiment shown in FIGS. 6 and 6A extend from the front face of the front wall 36 to a top face of the lug 42 to provide added rigidity to the lug connection with the front wall and the remainder of the connector 12. It will be appreciated that braces 56 may or may not be included in the connector 12 according to various embodiments of this invention and any number of braces 56 in a variety of configurations may be utilized with the connector 12 according to various embodiments of this invention. One feature of the connector 12 according to FIGS. 6 and 6A is that a single spike 26 is required to secure the longitudinal ends 14 within the connector 12 as opposed to multiple spikes 26 used with earlier embodiments of the connector 12 shown herein.

Figure 8:
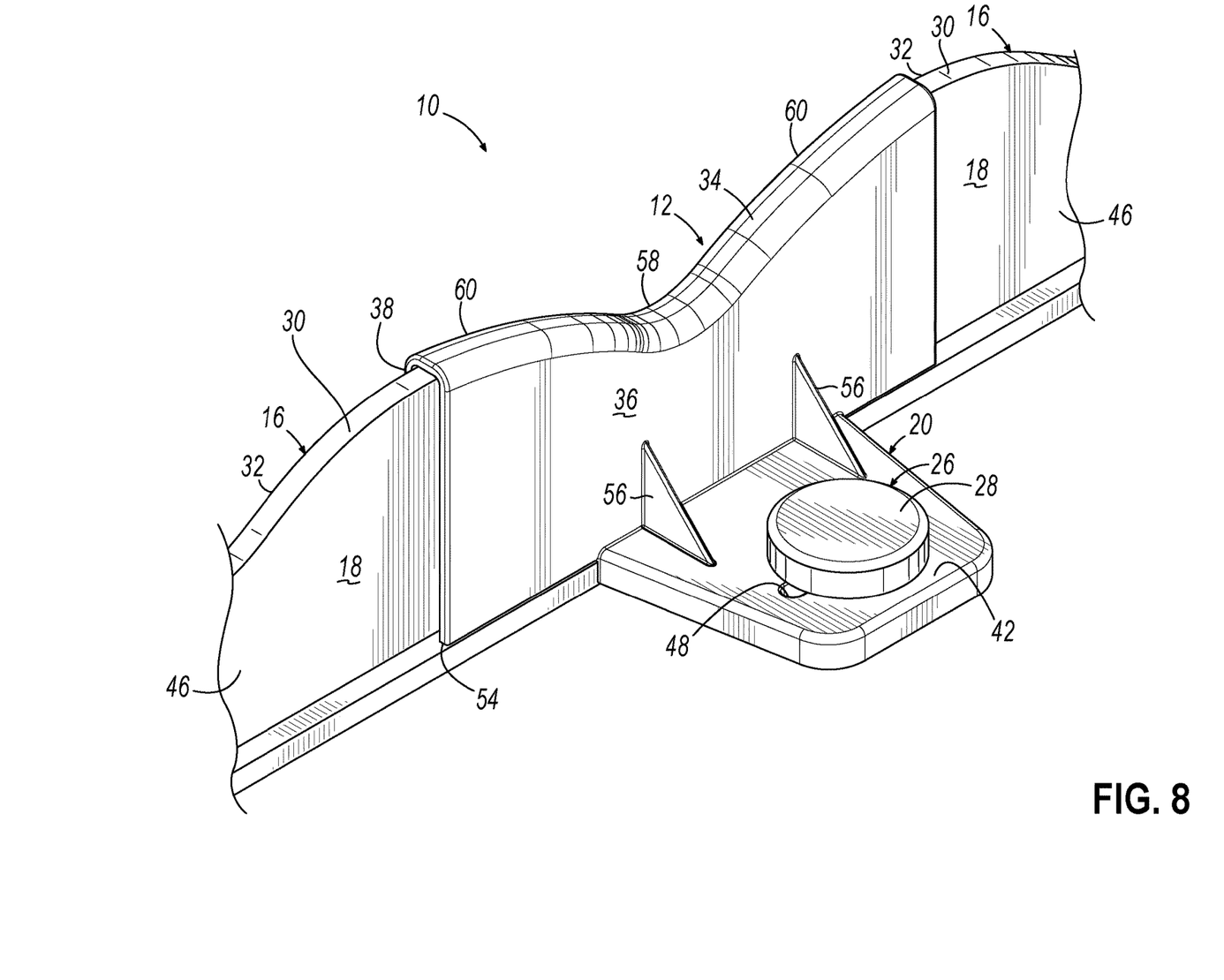
FIG. 8 is a front perspective view of a connector joining adjacent landscape edging sections together according to a still further embodiment of this invention.

Referring to FIG. 8, the front wall 36, back wall 38 and cap 34 may be shaped or contoured to conform to the shape and configuration of the upper edge 30 of the upstanding wall 18 of the adjacent landscape edging sections 16. The cap 34 of the connector 12 in FIG. 8 has a depression 58 and upwardly undulating lateral portions 60 to conform to a scalloped-shaped upper edge 30 of the upstanding wall 18 of the landscape edging sections 16. Once again, other shapes and configurations of connectors 12 may be utilized within the scope of this invention to conform to the shape of the landscape edging sections 16. Other connector 12 designs within the scope of this invention are shown in U.S. patent application Ser. No. 29/681,426, filed Feb. 26, 2019 and hereby incorporated by reference in its entirety.

It will be appreciated by those of ordinary skill in the art that the designs and embodiments shown herein and according to this invention are designed to accommodate a range of upstanding wall heights of landscape edging sections. The connector 12 according to this invention does a much better job of retaining the landscape edging ends 14 and keeping them aligned. The connector 12 also enables a concealed gap G between the longitudinal ends 14 of the edging sections 16 to allow for thermal expansion and contraction which can cause edging installations to become wavy in response to changes in climatic condition. Moreover, the gap G which allows for expansion and contracting of the landscape edging sections 16 is concealed within the connector 12 and does not provide a visual detriment to the landscape edging installation. Holes or apertures in the tabs of the landscape edging section may be sized and configured to allow for longitudinal movement of the edging sections.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A landscape edging system comprising:
   at least one landscape edging section;
   a generally vertical upstanding wall of the at least one landscape edging section with a front face and a back face joined by an upper edge of the upstanding wall;
   a first and a second longitudinal end of the at least one landscape edging section; and
   a connector joining the first and second longitudinal ends of the at least one landscape edging section;
   a back wall of the connector;
   a front wall of the connector generally parallel to the back wall;
   a cap joining the back wall and the front wall, a profile of the back wall, the front wall and the cap forming a generally inverted U-shaped channel;
   wherein the first and second longitudinal ends are seated within the channel to thereby join the first and second longitudinal ends together;
   a lug projecting from a lower portion of the one of the front wall and the back wall and being oriented generally perpendicular to the front wall;
   a spike coupled to the lug to secure the connector and the first and second longitudinal ends to a ground surface; and
   an aperture in the lug receiving the spike therethrough.

2. The system of claim 1 wherein the cap is located proximate an upper edge of the back wall and an upper edge of the front wall.

3. The system of claim 1 wherein the first and second longitudinal ends are spaced from one another within the channel to define a gap therebetween.

4. The system of claim 3 further comprising:
   a rib within the gap joining the back wall and the front wall.

5. The system of claim 1 wherein a height of the front wall is less than a height of the back wall.

6. The system of claim 1 wherein a height of the front wall and a height of the back wall is not constant along a length of the connector.

7. The system of claim 1 wherein the cap further comprises:
   at least one depression and at least one undulating portion which generally conform with a shape of the top edge of the at least one landscape edging section.

8. The system of claim 1 wherein the at least one landscape edging section further comprises a first and a second landscape edging section, wherein the first longitudinal end and the second longitudinal end are on the first and second landscape edging sections, respectively.

9. A landscape edging system comprising:
   a first and a second landscape edging section each having a generally vertical upstanding wall with a front face and a back face joined by an upper edge of the upstanding wall;
   a first and a second longitudinal end on the first and second landscape edging section, respectively; and
   a connector joining the first longitudinal end of the first landscape edging section to the second longitudinal end of the second landscape edging section;
   a back wall of the connector;
   a front wall of the connector generally parallel to the back wall;
   a cap joining the back wall and the front wall, a profile of the back wall, the front wall and the cap forming a generally inverted U-shaped channel;
   wherein the first and the second longitudinal ends are seated within the channel to thereby join the first and second landscape edging sections together;
   a lug projecting from a lower portion of the one of the front wall and the back wall and being oriented generally perpendicular to the front wall;
   a spike coupled to the lug to secure the connector and the first and the second longitudinal ends to a ground surface; and
   an aperture in the lug receiving the spike therethrough.

10. The system of claim 9 wherein the cap is located proximate an upper edge of the back wall and an upper edge of the front wall.

11. The system of claim 9 wherein the first longitudinal ends are spaced from one another within the channel to define a gap therebetween.

12. The system of claim 11 further comprising:
    a rib within the gap joining the back wall and the front wall.

13. The system of claim 9 wherein a height of the front wall is less than a height of the back wall.

14. The system of claim 9 wherein a height of the front wall and a height of the back wall is not constant along a length of the connector.

15. The system of claim 9 wherein the cap further comprises:
    at least one depression and at least one undulating portion which generally conform with a shape of the top edge of the first and second landscape edging sections.

\* \* \* \* \*